US010644888B2

(12) United States Patent
Tsirkin et al.

(10) Patent No.: US 10,644,888 B2
(45) Date of Patent: *May 5, 2020

(54) SYSTEMS AND METHODS FOR PROVIDING I/O STATE PROTECTIONS IN A VIRTUALIZED ENVIRONMENT

(71) Applicant: Red Hat, Inc., Raleigh, NC (US)

(72) Inventors: Michael Tsirkin, Lexington, MA (US); Karen Noel, Pembroke, NH (US)

(73) Assignee: RED HAT, INC., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/264,888

(22) Filed: Feb. 1, 2019

(65) Prior Publication Data
US 2019/0173678 A1  Jun. 6, 2019

Related U.S. Application Data

(63) Continuation of application No. 15/442,737, filed on Feb. 27, 2017, now Pat. No. 10,243,746.

(51) Int. Cl.
*H04L 12/00* (2006.01)
*H04L 9/32* (2006.01)
(Continued)

(52) U.S. Cl.
CPC ........ *H04L 9/3247* (2013.01); *G06F 9/45558* (2013.01); *G06F 21/602* (2013.01); *G06F 21/72* (2013.01); *H04L 9/3239* (2013.01); *G06F 2009/45579* (2013.01); *G06F 2009/45587* (2013.01)

(58) Field of Classification Search
CPC ............ H04N 21/4437; G06F 9/45533; G06F 2009/25549
See application file for complete search history.

(56) References Cited

U.S. PATENT DOCUMENTS 7,793,286 B2  9/2010  Bennett et al.
8,151,264 B2  4/2012  Bennett et al.
(Continued)

FOREIGN PATENT DOCUMENTS

WO   WO 2016/118032   7/2016

OTHER PUBLICATIONS

Hetzelt, Felicitas, et al., Security Analysis of Encrypted Virtual Machines, Technical University of Berlin, Dec. 4, 2016, 13 PQS.
(Continued)

*Primary Examiner* — Ponnoreay Pich
(74) *Attorney, Agent, or Firm* — Haynes and Boone, LLP (57) ABSTRACT

Methods, systems, and computer program products are included for providing I/O state protections to a virtualized environment. An example method includes configuring, by a hypervisor, a processor to execute instructions corresponding to a guest of a virtual machine (VM). As part of a transition of operations from the VM to the hypervisor, the guest specifies a first register of the processor. The processor then provides the hypervisor with access to non-encrypted data stored in first register, while data stored in non-specified registers is maintained in the processor in an encrypted format. The hypervisor receives the non-encrypted data from the first register.

20 Claims, 4 Drawing Sheets

(51) Int. Cl.
    *G06F 9/455*       (2018.01)
    *G06F 21/60*       (2013.01)
    *G06F 21/72*       (2013.01)

(56) References Cited

U.S. PATENT DOCUMENTS

| | | |
|---|---|---|
| 8,370,559 B2 | 2/2013 | Schoenberg et al. |
| 9,129,106 B2 | 9/2015 | Sharif et al. |
| 10,243,746 B2 * | 3/2019 | Tsirkin .............. H04L 9/3247 |
| 2012/0331464 A1 | 12/2012 | Saito |
| 2015/0339142 A1 | 11/2015 | Tsirkin |
| 2016/0048680 A1 | 2/2016 | Lutas et al. |
| 2016/0148001 A1 | 5/2016 | Bacher |
| 2017/0132158 A1 | 5/2017 | Axnix |
| 2018/0211049 A1 | 7/2018 | Kelso |

OTHER PUBLICATIONS

Chandrasekaran, Dinesh, et al., Hardware-assisted Secure Virtualization, Department of Computer Science and Engineering, Department of Electrical and Computer Engineering, Polytechnic Institute of New York University, 8 nns.

* cited by examiner

SYSTEMS AND METHODS FOR PROVIDING I/O STATE PROTECTIONS IN A VIRTUALIZED ENVIRONMENT

PRIORITY INFORMATION

This application is a continuation of U.S. patent application Ser. No. 15/442,737 filed Feb. 27, 2017 and entitled "Systems and Methods for Providing I/O State Protections in a Virtualized Environment," the disclosure of which is hereby incorporated by reference in the entirety.

FIELD OF DISCLOSURE

The present disclosure generally relates to digital data processing and virtualization, and more particularly relates to techniques for securing a virtual environment.

BACKGROUND

A virtual machine is software that is executed on hardware to create a virtualization of a physical computer system. Virtual machines function as self-contained platforms that run their own operating systems and software applications. A host machine concurrently runs one or more virtual machines using software that is referred to as a hypervisor. The hypervisor allocates portions of the host machine's resources to the virtual machines. These resources include, for example, the host machine's underlying physical processors and memory devices.

Guest applications, including guest operating systems, are executed on the allocated resources of each virtual machine. Local or remote clients access these guest applications to perform computing tasks. In some instances, virtual machines and guest applications are implemented to provide cloud computing environments.

SUMMARY

A system of one or more computers perform particular operations or actions by virtue of having software, firmware, hardware, or a combination thereof, installed on the system that in operation causes or cause the system to perform the actions. One or more computer programs perform particular operations or actions by virtue of including instructions that, when executed by data processing apparatus, cause the apparatus to perform the actions. One general aspect includes a method including: configuring, by a hypervisor, a central processing unit (CPU) to execute instructions corresponding to a guest of a virtual machine (VM), where the CPU includes a plurality of registers; and detecting, by the hypervisor, a transition from the VM to the hypervisor, the transition including: specifying, by the guest, a first register of the plurality of registers, where a second register of the plurality of registers is not specified; providing, by the CPU, access to data stored in the plurality of registers, where data stored in the first register includes non-encrypted data, and where data stored in the second register includes encrypted data; and receiving, by the hypervisor, the non-encrypted data. Other examples of this aspect include corresponding computer systems, apparatus, and computer programs recorded on one or more computer storage devices, each to perform the actions of the methods.

One general aspect includes a non-transitory machine-readable medium having stored thereon machine-readable instructions executable to cause at least one machine to perform operations including: configuring, by a hypervisor, a processor to execute instructions corresponding to a guest of a virtual machine (VM), where the processor includes a plurality of registers; and detecting, by the hypervisor, a transition from the VM to the hypervisor, the transition including: specifying, by the guest, a first register of the plurality of registers, where a second register of the plurality of registers is not specified; providing, by the processor, access to data stored in the plurality of registers, where data stored in the first register includes non-encrypted data, and where data stored in the second register includes encrypted data; and receiving, by the hypervisor, the non-encrypted data. Other examples of this aspect include corresponding computer systems, apparatus, and computer programs recorded on one or more computer storage devices, each to perform the actions of the methods.

One general aspect includes a system including: a processor coupled to at least one non-transitory memory, the processor including a plurality of registers; a hypervisor that configures the processor to execute instructions corresponding to a guest of a virtual machine (VM), the hypervisor to detect a transition from the VM to the hypervisor, the transition including: specifying, by the guest, a first register of the plurality of registers, where a second register of the plurality of registers is not specified; providing, by the processor, the hypervisor with access to data stored in the plurality of registers, where data stored in the first register includes non-encrypted data, and where data stored in the second register includes encrypted data; and loading, by the hypervisor, the non-encrypted data. Other examples of this aspect include corresponding computer systems, apparatus, and computer programs recorded on one or more computer storage devices, each to perform the actions of the methods.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Various examples described herein provide cryptography techniques that provide privacy and security advantages in a virtualized environment. For example, a virtualized environment may include a hypervisor that provides multiple virtual machines that run guest applications. These virtualized machines may be provided to different organizations and/or other entities. It is beneficial to implement cryptography in the virtualized environment to protect the data associated with these entities.

Conventional cryptography techniques have problems with protecting virtual machines from the hypervisor that manages the virtual machines. In more detail, the hypervisor is provided with full access to the virtual machines (including full access to data stored in the virtual processors assigned to the virtual machines) to provide emulation features for these virtual machines. Accordingly, in conventional virtualization technology, the hypervisor is allowed to inspect and modify data corresponding to virtual machines. Thus, conventional virtual machines are not protected from malicious hypervisor actions. For example, the hypervisor may modify data stored in a virtual processor to cause a guest running on a virtual machine to bypass security checks or leak private data to the hypervisor.

Modern technologies have introduced the ability to encrypt virtual machine memory spaces to protect these memory spaces from being read by the hypervisor. However, the problem remains that when a guest executes instructions causing a virtual machine exit, such as to perform I/O (input and/or output) operations or by executing a hypercall, the hypervisor can read and otherwise manipulate the processor state of the virtual machine that runs the guest. As a result, the virtual machine may leak private data to the hypervisor via the processor. Moreover, the hypervisor may also manipulate the virtual machine's memory by manipulating data stored in the virtual machine's processor.

The techniques describe herein address the problems described above using cryptography. In more detail, processor states for virtual machines are maintained in virtual processors in an encrypted format to protect the processor states from being read and otherwise manipulated by the hypervisor. When a virtual machine exit is performed, a guest of the virtual machine specifies one or more registers of the processor that relate to the reason for the exit. The hypervisor is provided access to the non-encrypted data in the specified registers of the processor so that the hypervisor can provide emulation functionality for handling page faults, performing I/O, and other virtual machine management functionality.

The data in registers that are not specified is stored in an encrypted format in the processor so that the data is protected from hypervisor access. By encrypting data from non-specified registers that are not related to a reason for a virtual machine exit, the hypervisor is prevented from accessing or manipulating the data in these non-specified registers. The non-specified registers remain encrypted across exit/entry to protect the data in the registers from being accessed by the hypervisor.

When re-entering the virtual machine after performing management operations, the hypervisor may also be permitted to modify specified registers that relate to the reason for the virtual machine exit. As described herein, when a virtual machine entry occurs, the hypervisor is permitted to modify data stored in specified registers. The processor encrypts data provided by the hypervisor and loads the encrypted data into the specified registers. For example, for I/O read instructions, the processor is configured to encrypt specified registers relating to the I/O, such as the registers containing the data read from devices and provided to guests of the virtual machine. The non-specified registers remain encrypted across exit/entry to protect the data in the registers from being accessed by the hypervisor.

These techniques described herein are beneficial and advantageous for providing virtual machine protection mechanisms that enhance the privacy and/or security of virtual machines. Of course, it is understood that these features and advantages are shared among the various examples herein and that no one feature or advantage is required for any particular example.

The techniques described herein are compatible with cryptography technologies provided by hardware, such as SOFTWARE GUARD EXTENSIONS (SGX) and SECURE ENCRYPTED VITRUALIZATION (SEV). These are merely some examples of cryptography technologies, and it is understood that the techniques described herein are applicable to other technologies as well, whether implemented in software, hardware, or some combination thereof.

Figure 1:
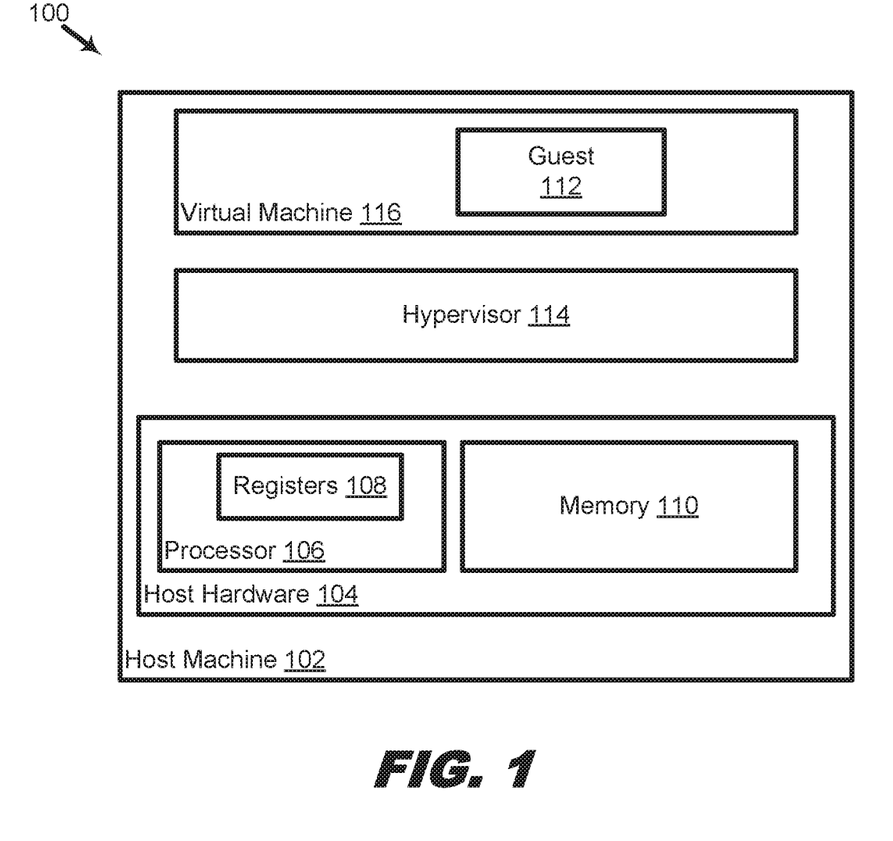
FIG. 1 is an organizational diagram illustrating a system that is structured to provide a virtualized environment that supports specified register encryption, in accordance with various examples of the present disclosure.

FIG. 1 is an organizational diagram illustrating a system that is structured to provide a virtualized environment that supports specified register encryption and/or decryption, in accordance with various examples of the present disclosure.

The system 100 includes a host machine 102. The host machine 102 may include a personal computer (PC), tablet PC, rack mount computer, cellular telephone, web appliance, server, network router, switch or bridge, or any machine capable of executing a set of instructions (sequential or otherwise) that specify actions to be taken by that machine. Further, while a single source host machine is illustrated, the term "machine" shall also be taken to include any collection of machines that individually or jointly execute a set (or multiple sets) of instructions to perform any one or more of the methodologies discussed herein. For example, a collection of machines may be communicatively coupled via one or more network devices and/or transport media.

The host machine 102 is structured with host hardware 104. The host hardware 104 includes physical elements such as a processor 106 and a memory 110. In some examples more than one of each of these hardware elements may be included. For example, the host hardware 104 may include a plurality of processors coupled to various types of memory and host devices.

The processor 106 is structured to include one or more general-purpose processing devices such as a microprocessor, central processing unit (CPU), and the like. More particularly, the processor 106 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processor 106 is structured to include one or more special-purpose processing devices such as an application specific integrated circuit (ASIC), a field programmable gate array (FPGA), a digital signal processor (DSP), network processor, and so forth. The processor 106 executes instructions for performing the operations, steps, and actions discussed herein.

The processor 106 is structured to include one or more registers 108. These registers may include an instruction pointer register and a plurality of general purpose registers that store data relating to execution of instructions by the processor 106. For example, an instruction pointer register may store an address that indicates a location of a next instruction to be executed by the processor. The general purpose registers may be used to store addresses and/or operands that the processor reads from the registers to perform arithmetic or logical operations. The processor may also store results from arithmetic or logical operations in the registers. Data may be loaded into the registers from memory that is external to the processor 106. Similarly, data from the registers may be loaded into external memory.

The memory 110 is structured to include at least one computer-readable storage medium on which is stored one or more sets of instructions (e.g., software) that provide any one or more of the methodologies or functions described herein. The memory 110 may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in a non-transitory machine-readable medium that are executable by the processor 106.

The processor 106 and memory 110 may be communicatively coupled via one or more buses (e.g., a PCI bus) and/or integrated into a motherboard of the host machine 102. The host hardware 104 also may include other hardware devices, such as a video display unit (e.g., a liquid crystal display (LCD) monitor), alphanumeric input device (e.g., a keyboard), cursor control device (e.g., a mouse), signal generation device (e.g., a speaker), a network interface card, wireless adapter card, audio/sound card, graphics card, storage adapter, and/or other hardware device.

The host machine 102 is structured to provide the hypervisor 114, which may also be referred to as a virtual machine monitor and/or virtual machine manager. The hypervisor 114 is structured to include executable instructions that are stored in the memory 110 and executed by the processor 106 to provide virtual machine emulation capabilities. In some examples, the hypervisor 114 is structured to run on top of an operating system and/or kernel. In other examples, the hypervisor 114 is run directly on host hardware 104 without the use of a separate operating system or kernel.

The hypervisor 114 is structured to provide the virtual machine 116 by virtualizing at least a portion of the host hardware 104. The hypervisor 114 may provide the virtual machine 116 by performing a hardware emulation, full virtualization, para-virtualization, and/or operating system-level virtualization. The hypervisor 114 is structured to manage system resources, including management capabilities to provide applications that are running on the virtual machine 116 with access to portions of the host hardware 104, such as the processor 106 and the memory 110. For example, the hypervisor 114 may perform input/output (I/O) operations on behalf of applications running on the virtual machine 116 to allow the applications to communicate with physical elements of the host hardware 104.

In more detail, the hypervisor 114 may allocate a guest memory to each virtual machine, such as virtual machine 116. The guest memory comprises a portion of the memory 110. The hypervisor 114 may allocate the guest memory using page tables and/or other memory mapping features, which may be stored in the guest memory or in a portion of the memory 110 that is allocated to the hypervisor 114.

The hypervisor 114 may allocate one or more virtual processors to each virtual machine, such as virtual machine 116. Each virtual processor may be mapped to the processor 106 so that instructions that the guests pass to the virtual processors are executed by the processor 106. The hypervisor 114 and/or virtual machine 116 structure each virtual processor to include registers, which are mapped to registers 108 of the processor 106.

The virtual machine 116 is structured to include a guest 112. The guest 112 may be structured as one or more applications that are run on the virtualized hardware that the hypervisor 114 provides as a virtual machine 116. The guest 112 may include applications such as an operating system, kernel, one or more user applications, and any combination thereof. These applications may be stored in a guest memory that is allocated to the virtual machine 116 and executed by a virtualized processor that is mapped by the hypervisor 114 to processor 106.

A guest kernel of the virtual machine 116 may provide core computing functionality, such as allocating memory pages of the virtual machine's guest memory to processes and/or threads, communicating input and/or output (I/O) to and from virtual devices, managing a file system, handling interrupts, scheduling and running processes to execute instructions of computing tasks by a virtual processor, providing an interface between devices and software applications, and/or providing other computing features. A guest operating system of the virtual machine 116 may run on top of the kernel to provide additional interfaces and functionality on the virtual machine 116 beyond those offered by the kernel. The guest operating system may include, for example, RED HAT ENTERPRISE LINUX, FEDORA, WINDOWS, OS X, IOS, ANDROID, or any other operating system. In some examples, the virtual machine 116 may be structured to include a plurality of kernels and/or operating systems.

The guest 112 is structured to include computer-readable instructions, which are stored in the memory 110 and that are provided to the processor 106 for execution. The instructions corresponding to the guest 112 are loaded into registers 108 of the processor 106. Similarly, the hypervisor 114 may load instructions into registers 108 of the processor 106 and access the data stored in the registers 108. The guest 112 and hypervisor 114 may load data into the registers 108 and access data in the registers 108 using processor specific instructions, which may vary for different hardware processor vendors.

While only one guest is shown, generally a virtual machine is capable of running many guests and typically would do so. Moreover, although only one virtual machine is illustrated as running on host machine 102, the hypervisor 114 may provide a plurality of virtual machines that are run in parallel on the host machine 102. These other virtual machines may similarly run guest applications and access portions of the host hardware 104 that are allocated to the virtual machines by the hypervisor 114.

Figure 2:
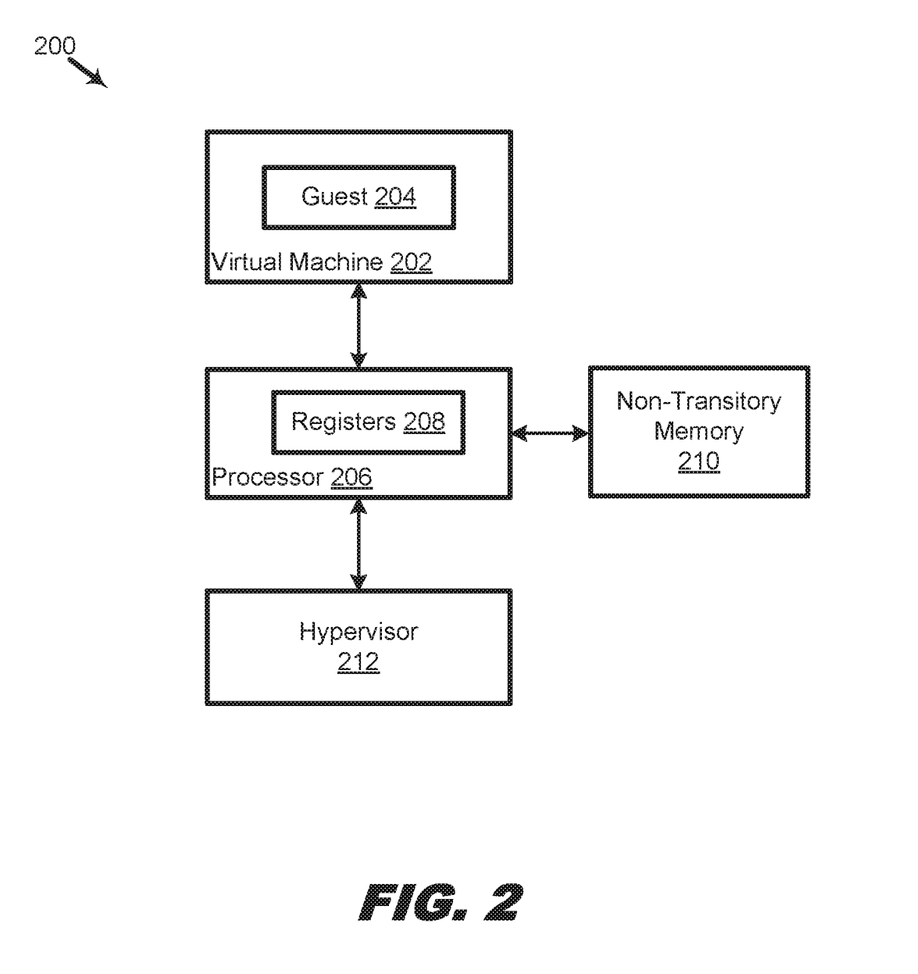
FIG. 2 is an organization diagram illustrating a system that performs techniques to protect processor registers corresponding to a virtual machine, in accordance with various examples of the present disclosure.

FIG. 2 is an organization diagram illustrating a system 200 that performs techniques to protect one or more processor registers corresponding to a virtual machine, in accordance with various examples of the present disclosure. In some examples, the techniques are performed by executing, using one or more processors, computer-readable instructions that are stored in a non-transitory memory. The non-transitory memory and processors may be provided by, for example, the host hardware described with respect to FIG. 1.

The system 200 includes a virtual machine 202. In the present example, the virtual machine 202 runs one or more guests 204, which include instructions that are stored in a memory that is allocated to the virtual machine 202. The guests 204 run on virtualized hardware that is presented by the virtual machine 202. This virtualized hardware that is presented by the virtual machine 202 may include all or a portion of host hardware, which may include one or more processors and one or more memories.

The guests 204 of the virtual machine 202 provide instructions to a processor 206 for execution. The processor 206 includes registers 208, which store guest instructions and data corresponding to the instructions. For example, the registers 208 may be used by the processor 206 to store inputs and outputs corresponding to the instructions to perform arithmetic and/or logical operations. The processor 206 may be structured as a virtual processor that is mapped to one or more physical processors by the virtual machine 202 and/or a hypervisor 212.

The processor 206 is coupled to a non-transitory memory 210, which stores a data structure that maps between specified registers and exit reasons. Exit reasons may include, for example, exiting from the virtual machine 202 to the hypervisor 212 for the hypervisor 212 to handle virtual device I/O, page faults, and/or hypercalls. The mapping identifies registers, for each exit reason, that the processor 206 is to provide to the hypervisor 212 in a non-encrypted format. Similarly, the mapping identifies registers, for each exit reason, that the hypervisor 212 is permitted to update with modified non-encrypted data.

After the processor 206 executes at least some instructions corresponding to the guests 204, execution is transitioned from the virtual machine 202 to the hypervisor 212. In some examples, the transitioning of execution from the virtual machine 202 to the hypervisor 212 is triggered by a virtual machine exit instruction, a fault, a hypercall, virtual device I/O, or some combination thereof. When execution is transitioned to the hypervisor 212 (including shortly before or after the transition), the guest 204 identifies an exit reason and reads the mapping to determine which registers to specify to the processor 206. Accordingly, based on reading the mapping, the guest specifies to the processor 206 one or more registers 208 that correspond to the exit reason.

The processor 206 provides the data from the one or more specified registers to the hypervisor 212 in a non-encrypted format. The processor 206 encrypts the data in non-specified registers to protect this data from being read by the hypervisor 212. The data in the non-specified registers is maintained by the processor 206 in an encrypted format, such that the hypervisor 212 is prevented from reading data from the non-specified registers.

The hypervisor 212 may read non-encrypted data from the specified registers 208 to perform one or more operations relating to management of the virtual machine 202, such as performing I/O with host hardware on behalf of the virtual machine 202, handling page faults, performing management functionality relating to hypercalls, and so forth. In some examples, as part of its virtual machine management tasks, the hypervisor 212 may modify the non-encrypted data.

After the hypervisor 212 completes its management tasks, the processor 206 resumes processing of instructions corresponding to the guests 204 of the virtual machine 202. In some examples, the processor's resuming of processing of guest instructions is triggered by a virtual machine entry instruction that is provided to the processor 206 by the hypervisor 212. When the execution of the instructions corresponding to the guests 204 of the virtual machine 202 is resumed, the modified non-encrypted data may be encrypted by the processor 206 and stored in the specified registers 208 of the processor 206. This modified encrypted data may overwrite data that was previously stored in the registers 208.

Figure 3:
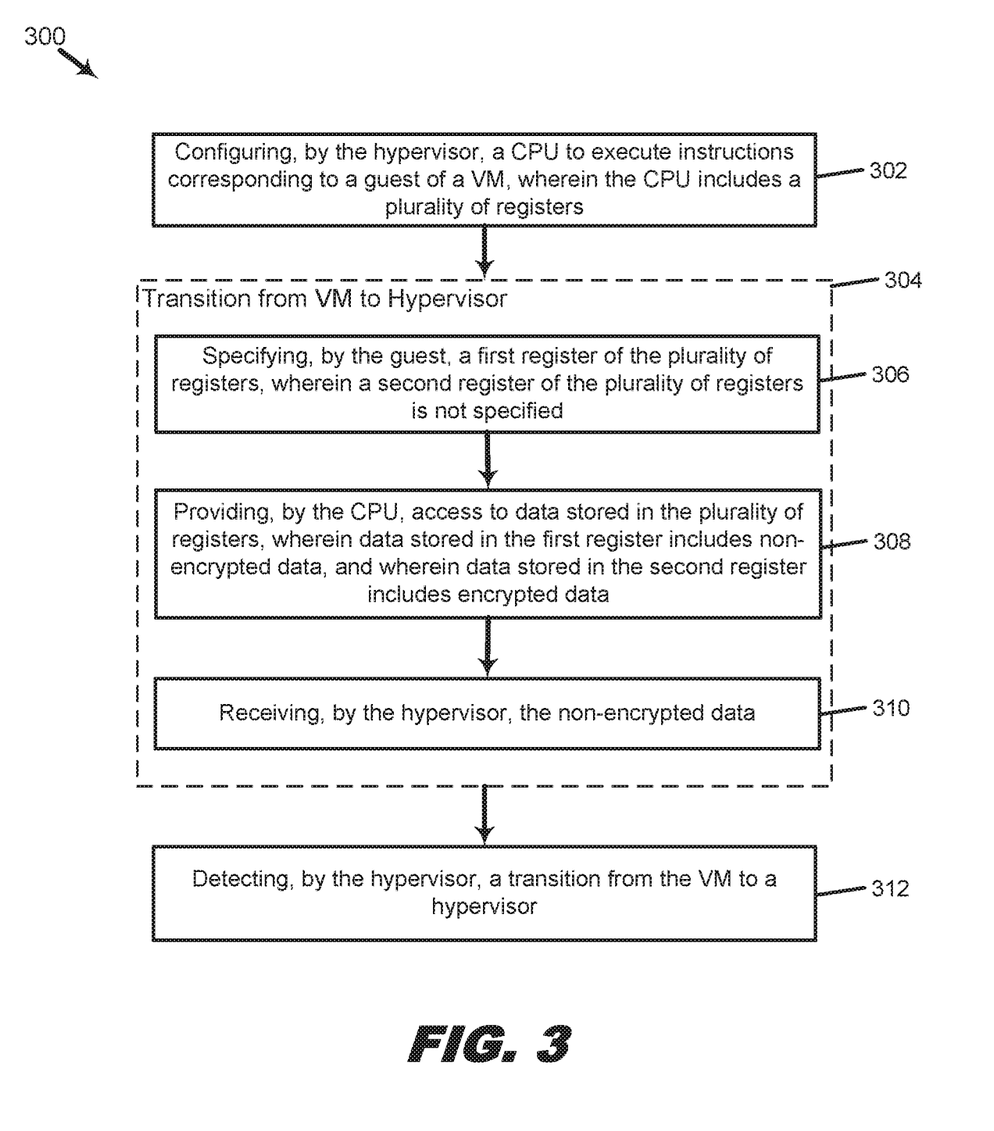
FIG. 3 is a flow diagram illustrating a method for providing I/O state protection when transitioning processing from a virtual machine to a hypervisor, in accordance with various examples of the present disclosure.

FIG. 3 is a flow diagram illustrating a method 300 for providing I/O state protection when transitioning processing from a virtual machine to a hypervisor, in accordance with various examples of the present disclosure. In some examples, the method is performed by the system components described with respect to FIG. 1 and/or FIG. 2. The method may be performed by processing logic that may comprise hardware (e.g., circuitry, dedicated logic, programmable logic and microcode), software (such as instructions run on a computer system, specialized hardware, dedicated machine, or processing device), firmware, or a combination thereof. Additional steps can be provided before, during, and after the steps of method, and some of the steps described can be replaced, eliminated and/or re-ordered for other examples of the method.

At action 302, a hypervisor configures a CPU to execute instructions corresponding to a guest of a virtual machine, wherein the CPU includes a plurality of registers. In some examples, the hypervisor configures the CPU by assigning one or more virtual CPUs to the virtual machine during a boot/initialization process of the virtual machine. Accordingly, the configured CPU may include one or more virtual CPUs. In some examples, the hypervisor maps the virtual CPUs to one or more physical CPUs. Guests running on the virtual machine may then provide instructions to the one or more virtual CPUs, which are passed to the one or more physical CPUs, based on the hypervisor mapping, for execution.

Guests on the virtual machine provide the CPU with addresses corresponding to instructions for the CPU to execute. Guests also provide the CPU with data that the CPU uses to perform arithmetic and logical operations for executing the instructions. In some examples, the instructions are provided to the CPU by a kernel that runs on the virtual machine. The CPU may include an instruction pointer register that identifies an address of an instruction for the virtual CPU to execute and a plurality of general purpose registers that store data that the virtual CPU accesses to perform arithmetic and logical operations.

At action 304, a transition from the virtual machine to the hypervisor is performed. The transition may be caused by a VM exit, page fault, I/O access (such as virtual device I/O access), or other operation relating to the virtual machine that triggers the CPU to stop executing instructions of the virtual machine, at least temporarily, to cause hypervisor to perform one or more operations relating to management of the virtual machine. In some examples, the virtual machine or hypervisor causes the CPU to transition operations from the virtual machine by providing an instruction that triggers the CPU to transition from a guest mode to a host kernel and/or host userspace mode.

At action 306, as part of the transition, or shortly before or after the transition, the guest specifies a first register of the plurality of registers to the CPU. A second register of the plurality of registers is not specified. In some examples, the virtual machine and/or processor stores a data structure, such as a table that contains a mapping of transition reasons to registers. Accordingly, based on the reason for the transition, particular registers are specified by the guest to the CPU. In some examples, the guest specifies one or more registers to the CPU by setting CPU flags corresponding to the one or more registers.

For example, when the transition is caused by I/O access or a page fault, the guest may specify the instruction pointer register of the CPU. In another example, if the transition from the virtual machine to the hypervisor is triggered by a hypercall, the guest specifies one or more registers that are affected by the hypercall. The specified registers may include a subset of the CPU's registers, such that one or more other registers that are not in the subset are not specified to the CPU.

At action 308, as part of the transition, or shortly before or after the transition, the CPU provides the hypervisor with access to data stored in the plurality of registers. The data stored in the specified registers, such as the first register, is provided to the hypervisor in a non-encrypted format. The non-encrypted data from the first register is stored in a memory space that is accessible to the hypervisor.

The CPU encrypts the data stored in non-specified registers, such as the second register, to prevent the hypervisor from accessing the data in the non-specified registers. The data stored in the CPU's non-specified registers is maintained in the non-specified registers in an encrypted state. The CPU may perform the encryption using a private key that is assigned to the virtual machine and provided to the CPU by the virtual machine. Various cryptography techniques may be used to perform the encryption. As merely one example, the cryptography technique used to encrypt the CPU state may include a Secure Hash Algorithm (SHA) technique.

At action 310, as part of the transition, or shortly before or after the transition, the hypervisor receives the non-encrypted data from the registers that were specified in action 306 and provided by the CPU in action 308. In some examples, the hypervisor receives the non-encrypted data by loading the data from the CPU registers or from another memory space that is accessible to the hypervisor. In some examples, the hypervisor receives the non-encrypted data by loading data from one or more registers of a physical CPU that is mapped to the CPU.

At action 312, the hypervisor detects the transition from the virtual machine to the hypervisor and performs one or more operations responsive to the detecting of the transition. In some examples, the hypervisor detects the transition from the virtual machine to the hypervisor via a shared memory communication from a guest of the virtual machine, an interrupt received from the CPU or other device, or via a hypercall instruction. In some examples, the receiving of the non-encrypted data at action 310 is performed responsive to the hypervisor detecting the transition. After detecting the transition, the hypervisor performs one or more management tasks corresponding to the reason for the transition from the virtual machine to the hypervisor, such as resolving a page fault, handling I/O access, responding to a hypercall, or another management task corresponding to the virtual machine.

As an example, to handle virtual device I/O access corresponding to the virtual machine, the hypervisor may read the non-encrypted data from the specified registers and communicate the data to one or more physical devices. The hypervisor may also receive data from one or more physical devices and load the data into specified registers.

In another example, if the transition reason was a page fault, the hypervisor may handle the page fault and then update an instruction pointer register of the CPU to point to a current address or to a next address. After transitioning processing back to the virtual machine, the guest may then access data stored in a particular memory location that is indicated by the updated instruction pointer register.

Figure 4:
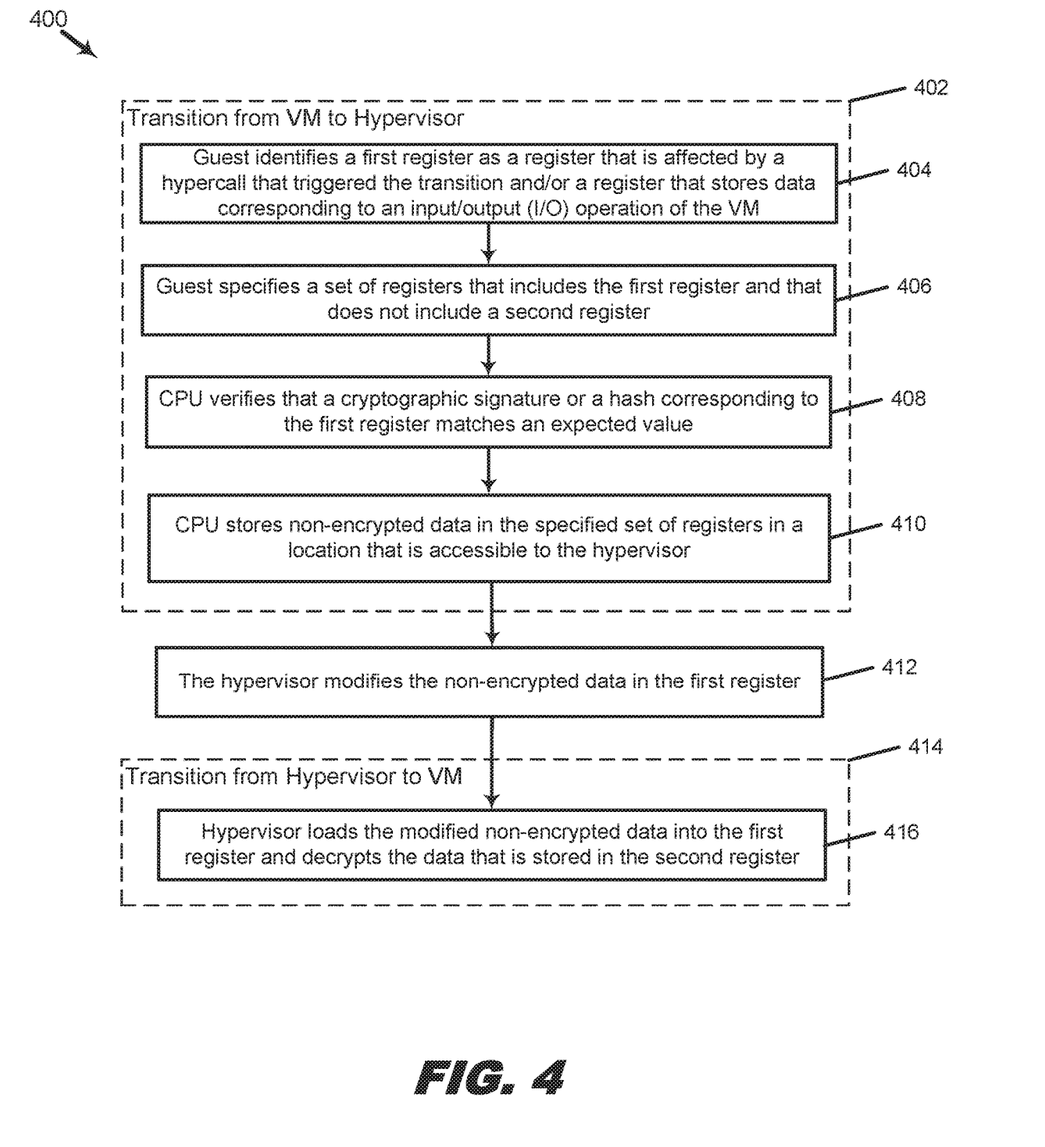
FIG. 4 is a flow diagram illustrating a method for providing non-encrypted CPU data from specified registers to a hypervisor for modification, in accordance with various examples of the present disclosure.

FIG. 4 is a flow diagram illustrating a method 400 for providing non-encrypted CPU data from specified registers to a hypervisor for modification, in accordance with various examples of the present disclosure. In some examples, the method is performed by the system components described with respect to FIG. 1 and/or FIG. 2. The method may be performed by processing logic that may comprise hardware (e.g., circuitry, dedicated logic, programmable logic and microcode), software (such as instructions run on a computer system, specialized hardware, dedicated machine, or processing device), firmware, or a combination thereof. Additional steps can be provided before, during, and after the steps of method, and some of the steps described can be replaced, eliminated and/or re-ordered for other examples of the method.

At action 402, an event such as a hypercall or I/O access triggers a transition from a virtual machine to the hypervisor. In some examples, a guest of the virtual machine provides a VM exit instruction or a hypercall instruction to a CPU for execution. In other examples, the hypervisor configures a CPU that is assigned to the virtual machine to transition from the virtual machine when the CPU identifies an I/O access corresponding to the virtual machine. An example of an I/O access includes communications between the guest and virtual devices that are assigned to the virtual machine by the hypervisor.

At action 404, the guest identifies a set of registers, including a first register, that are affected by the hypercall and/or that are identified as storing data corresponding to an input/output (I/O) access of the virtual machine.

At action 406, the guest specifies the set of registers, including the first register, to the CPU. The guest of the virtual machine or hypervisor may specify the one or more registers of the plurality of registers by setting one or more flags. In some examples, these flags are stored in the CPU's memory. In the present example, the specified one or more registers are a subset of the plurality of registers of the CPU, and at least portions of the plurality of registers are not included in the subset. For example, the registers included in the subset may be registers that the guest identifies as affected by the hypercall or I/O access, while the registers not included in the subset include the registers identified by the guest as not related to the hypercall or I/O access. In some examples, the virtual machine also specifies in action 406 the registers that the hypervisor is permitted to update with modified data. Accordingly, based on the reason for the transition from the virtual machine to the hypervisor or from the hypervisor to the virtual machine, the guest may specify to the CPU a particular set of registers from which the hypervisor is allowed to access and/or modify data.

At action 408, the CPU verifies that a cryptographic signature or a hash corresponding to the first register matches an expected value. In some examples, the CPU verifies the data using a key that is assigned to the virtual machine and that is provided to the processor by a guest of the virtual machine.

At action 410, after verifying that the cryptographic signature or hash matches the expected value, the CPU provides the non-encrypted data in the specified set of registers in a location that is accessible to the hypervisor. For example, the data may be stored in the registers of the CPU itself, in another memory space of the CPU, or in a memory space that is assigned to the virtual machine or the hypervisor. Data in the CPU's non-specified registers is maintained in the non-specified registers in an encrypted format to prevent the hypervisor from accessing the data.

At action 412, the hypervisor modifies the non-encrypted data provided from the first register. In the present example, the modifying of the data is performed corresponding to one or more management tasks performed by the hypervisor. For example, if the reason for the transition from the VM to the hypervisor was an I/O access, the hypervisor accesses a physical device or other data source to perform the I/O access on behalf of the virtual machine. In another example, if the reason for the transition was a hypercall, then the hypervisor executes one or more functions to perform management operations corresponding to the hypercall.

At action 414, after performing the virtual machine management functionality and modifying at least a portion of the non-encrypted data, the hypervisor causes a transition from the hypervisor to the virtual machine so that the CPU resumes execution of instructions corresponding to guests of the virtual machine. In some examples, the hypervisor causes the transition to the VM by providing a VM entry instruction to the CPU. In some examples, the hypervisor causes the CPU to resume operations of the virtual machine by providing an instruction to the CPU that triggers the CPU to transition from a host kernel and/or host userspace mode to a guest mode.

At action 416, the CPU loads the modified non-encrypted data into the set of specified registers, including the first register, and decrypts the encrypted data stored in the non-specified registers, including the second register. In some examples, the decryption is performed by the virtual machine providing a key to the CPU, which the CPU uses to decrypt the encrypted data stored in the non-specified registers. As merely one example, the cryptography technique used to decrypt the CPU state may include a Secure Hash Algorithm (SHA) technique.

Guests that have resumed processing on the virtual machine may receive the modified data and perform one or more operations to respond to the modified data. For example, if the transition reason related to an I/O access or a hypercall, a kernel running on the virtual machine may perform additional processing relating to the received data.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising:
configuring, by a hypervisor, a central processing unit (CPU) to execute instructions corresponding to a guest of a virtual machine (VM), wherein the CPU includes a plurality of registers; and
detecting, by the hypervisor, a transition from the VM to the hypervisor, the transition including:
specifying, by the guest, a first register of the plurality of registers, wherein a second register of the plurality of registers is not specified;
providing, by the CPU, access to data stored in the plurality of registers, wherein data stored in the first register includes non-encrypted data, and wherein data stored in a remainder of the plurality of registers includes encrypted data; and
receiving, by the hypervisor, the non-encrypted data.

2. The method of claim 1 further comprising:
based on the specifying, encrypting data stored in the second register.

3. The method of claim 1 further comprising:
modifying, by the hypervisor, the non-encrypted data; and
transitioning from the hypervisor to the VM, the transitioning including:
loading the modified non-encrypted data into the first register; and
decrypting, by the CPU, the encrypted data stored in the second register.

4. The method of claim 1 further comprising:
identifying the first register as storing data that corresponds to an input/output (I/O) operation of the VM.

5. The method of claim 1, further comprising:
triggering, by a hypercall, the transition from the VM to the hypervisor;
identifying the first register as a register that is affected by the hypercall; and
responsive to the identifying, specifying the first register.

6. The method of claim 1, wherein the specifying of the first register includes specifying a set of registers, and wherein data stored in the specified set of registers is accessible to the hypervisor.

7. The method of claim 1, wherein the specifying of the first register includes verifying that a cryptographic signature or a hash corresponding to the first register matches an expected value.

8. A non-transitory machine-readable medium having stored thereon machine-readable instructions executable to cause at least one machine to perform operations comprising:
configuring, by a hypervisor, a processor to execute instructions corresponding to a guest of a virtual machine (VM), wherein the processor includes a plurality of registers; and
detecting, by the hypervisor, a transition from the VM to the hypervisor, the transition including:
specifying, by the guest, one of the plurality of registers;
providing, by the processor, access to data stored in the plurality of registers, wherein data stored in a first register of the plurality of registers includes non-encrypted data, and wherein data stored in each non-specified register of the plurality of registers includes encrypted data; and
receiving, by the hypervisor, the non-encrypted data.

9. The non-transitory machine-readable medium of claim 8, the operations further comprising:
based on the specifying, encrypting data stored in a second register.

10. The non-transitory machine-readable medium of claim 8, the operations further comprising:
modifying, by the hypervisor, the non-encrypted data; and
transitioning from the hypervisor to the VM, the transitioning including:

loading the modified non-encrypted data into the first register; and decrypting, by the processor, the encrypted data stored in a second register.

11. The non-transitory machine-readable medium of claim 8, the operations further comprising:

identifying the first register as storing data that corresponds to an input/output (I/O) operation of the VM.

12. The non-transitory machine-readable medium of claim 8, the operations further comprising:

triggering, by a hypercall, the transition from the VM to the hypervisor;

identifying the first register as a register that is affected by the hypercall; and responsive to the identifying, specifying the first register.

13. The non-transitory machine-readable medium of claim 8, wherein the specifying of the first register includes specifying a set of registers, and wherein data stored in the specified set of registers is accessible to the hypervisor.

14. The non-transitory machine-readable medium of claim 8, wherein the specifying of the first register includes verifying that a cryptographic signature or a hash corresponding to the first register matches an expected value.

15. A system comprising:

a processor coupled to at least one non-transitory memory, the processor including a plurality of registers;

a hypervisor that configures the processor to execute instructions corresponding to a guest of a virtual machine (VM), the hypervisor to detect a transition from the VM to the hypervisor, the transition including:

specifying, by the guest, a first register of the plurality of registers, wherein a remainder of the plurality of registers is not specified;

providing, by the processor, the hypervisor with access to data stored in the plurality of registers, wherein data stored in the first register includes non-encrypted data, and wherein data stored in the remainder of the plurality of registers includes encrypted data; and loading, by the hypervisor, the non-encrypted data.

16. The system of claim 15, the transition further including:

based on the specifying, encrypting data stored in a second register.

17. The system of claim 15, the hypervisor further to:

modify the non-encrypted data; and trigger a transition from the hypervisor to the VM, the transition including:

loading the modified non-encrypted data into the first register; and decrypting, by the processor, the encrypted data stored in a second register.

18. The system of claim 15, the guest of the virtual machine to perform operations comprising:

triggering, by a hypercall, the transition from the VM to the hypervisor;

identifying the first register as a register that is affected by the hypercall; and responsive to the identifying, specifying the first register.

19. The system of claim 15, wherein the specifying of the first register includes specifying a set of registers, and wherein data stored in the specified set of registers is accessible to the hypervisor.

20. The system of claim 15, wherein the specifying of the first register includes verifying that a cryptographic signature or a hash corresponding to the first register matches an expected value.

* * * * *